Oct. 1, 1957 R. A. OLES 2,808,128
EMERGENCY VEHICLE BRAKE
Filed Oct. 27, 1954 2 Sheets-Sheet 1
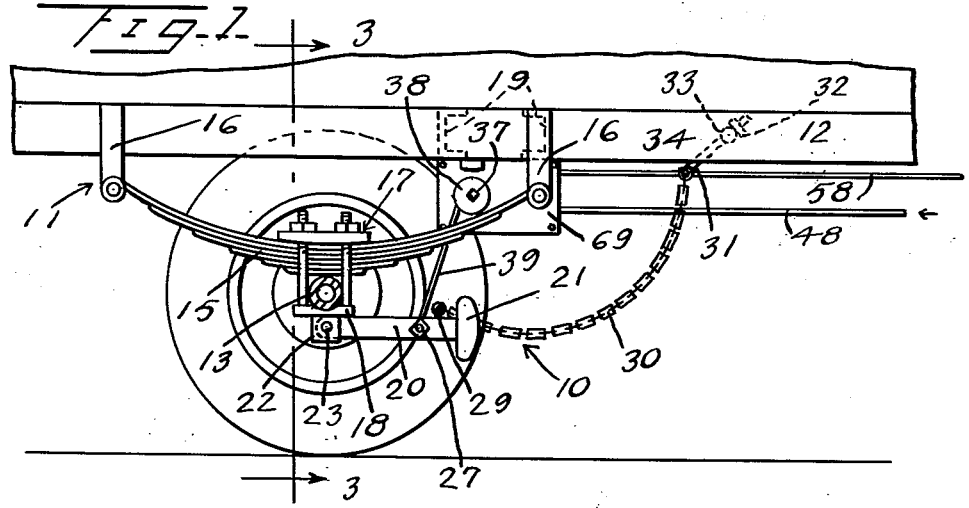
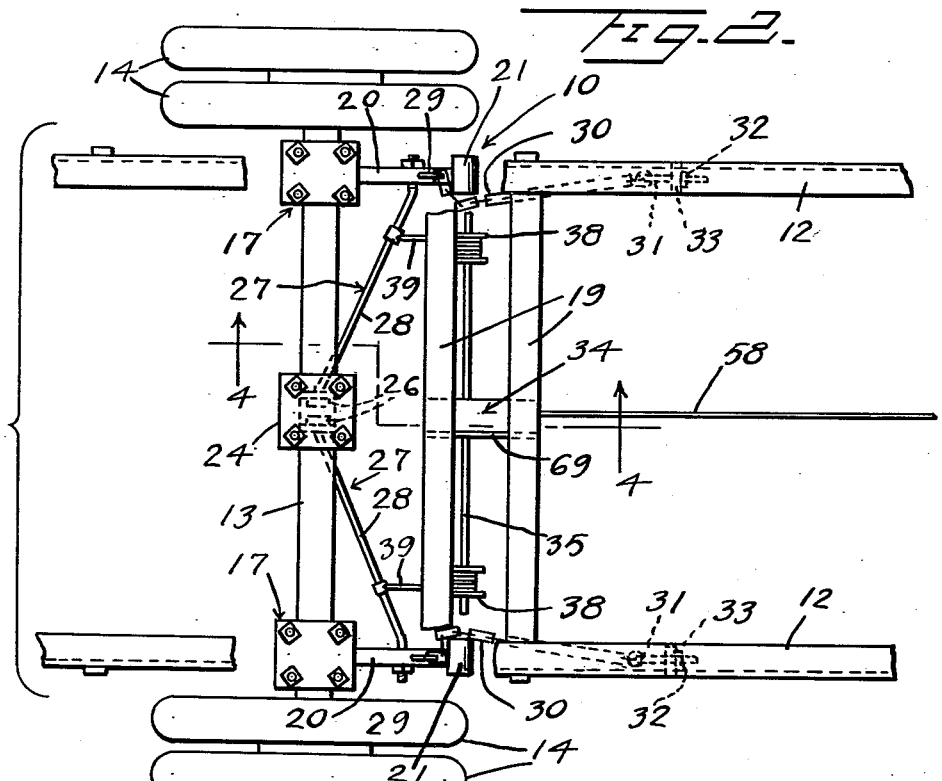
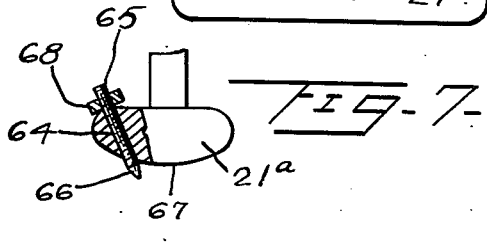
INVENTOR
R. A. Oles
BY John N. Randolph
ATTORNEY Oct. 1, 1957      R. A. OLES      2,808,128
EMERGENCY VEHICLE BRAKE
Filed Oct. 27, 1954      2 Sheets-Sheet 2
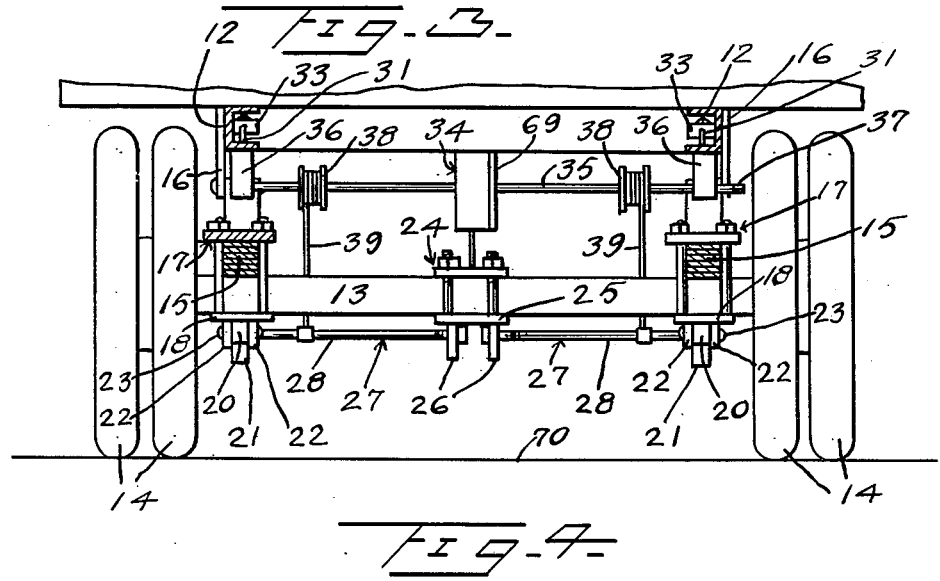
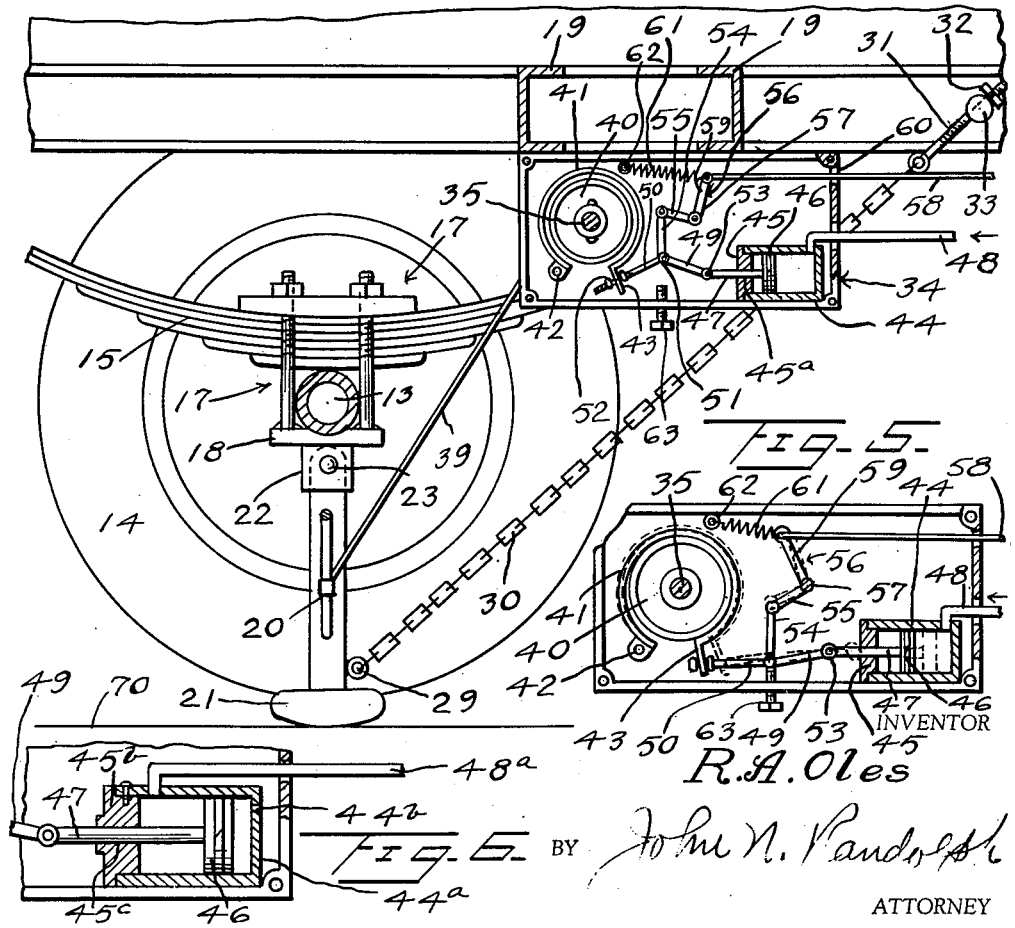
INVENTOR
R. A. Oles
BY John N. Randolph
ATTORNEY

United States Patent Office 2,808,128
Patented Oct. 1, 1957

2,808,128

EMERGENCY VEHICLE BRAKE

Roy A. Oles, Chatham, N. Y.

Application October 27, 1954, Serial No. 465,115

5 Claims. (Cl. 188—5)

This invention relates to a novel emergency brake for vehicles and more particularly to a novel auxiliary brake for motor vehicles, especially buses and trucks equipped with pneumatic, hydraulic or vacuum brake systems.

More particularly, it is an aim of the present invention to provide an auxiliary emergency brake which will be rendered automatically operative by failure of the conventional brake system for releasing road engaging members which move downwardly into surface engaging positions to provide a drag for effectively stopping the vehicle automatically upon failure of the conventional vehicle brakes.

Another object of the invention is to provide an auxiliary vehicle brake capable of also being operated manually to cause the auxiliary brake to assume a braking position.

Still another object of the invention is to provide an auxiliary emergency brake including novel control means for effecting operation of the brake either automatically or manually.

Various other objects and advantages of the invention will hereinafter become more fully apparent from the following description of the drawings, illustrating presently preferred embodiments thereof, and wherein:

Figure 1 is a side elevational view of a portion of a motor vehicle with a near wheel thereof removed and showing the auxiliary emergency brake applied thereto and in a normal, inoperative position;

Figure 2 is a top plan view of the vehicle chassis, the part thereof as illustrated in Figure 1, and showing the auxiliary brake disposed in an inoperative position;

Figure 3 is a cross sectional view taken substantially along a plane as indicated by the line 3—3 of Figure 1;

Figure 4 is an enlarged fragmentary longitudinal sectional view, taken substantially along a plane as indicated by the line 4—4 of Figure 2 and showing the auxiliary emergency brake in an operative position;

Figure 5 is a view similar to a portion of Figure 4 showing the brake release unit in two different positions thereof and different from the position as illustrated in Figure 4;

Figure 6 is an enlarged fragmentary view of a modification of a part of the structure as shown in Figure 5 for adapting the release unit to a different type of vehicle brake system, and Figure 7 is a side elevational view, partly in section, of a slightly modified form of one of the ground engaging elements of the auxiliary brake.

Referring more specifically to the drawings, for the purpose of illustrating a preferred application of the auxiliary vehicle emergency brake, designated generally 10 and comprising the invention, a rear portion of a trailer type motor vehicle has been illustrated in the drawings and said rear portion is designated generally 11 and includes side longitudinally extending frame members 12, a rear axle 13 and transversely aligned rear surface engaging wheels 14, which are journalled on the ends of the axle 13. The chassis members 12 are supported above and relative to the axle 13 by conventional leaf springs 15, the ends of which are connected to conventional hanger shackles 16, which are secured to and depend from the frame members 12. The intermediate portions of the springs 15 are secured over and against the axle 13 by conventional clamp members or shackles 17, each including a bottom plate which is located below the axle 13 and which is designated 18. The frame or chassis also includes cross members or braces 19 which are disposed relatively close to one another, in front of and near the rear axle 13.

The auxiliary emergency brake includes a pair of arms 20 of heavy rigid construction having surface engaging shoes 21 formed integral with or suitably secured to complementary ends thereof. The shoes 21 extend transversely of the longitudinal axes of the arms 20. Each of the bottom clamp plates 18 is provided with a pair of depending ears 22 to receive the opposite end of an arm 20. Pivot pins extend transversely through the ears 22 and said last mentioned ends of the arms 20 for swingably mounting the arms beneath the plates 18 for swinging movement of the arms longitudinally of the vehicle 11. However, it will be readily apparent that separate clamps could be secured to the axle 13 for supporting the pairs of ears 22 therebeneath on which the arms 20 could be swingably suspended in the same manner as previously described, and as illustrated in Figures 1, 3 and 4.

A double clamp 24 is secured to the intermediate portion of the rear axle 13 and includes two sets of fastenings which straddle the axle 13. The clamp 24 has a bottom plate 25 provided with spaced depending ears 26. As best seen in Figure 3, a pair of braces 27 have adjacent ends journalled in and connected to the ears 26 and remote ends which are connected to the arms 20, remote from their pivots 23. Said end portions of the braces 27 are disposed substantially parallel to one another and are connected by diagonal intermediate portions 28 of the braces. It will be readily apparent that the double clamp 24 could be made as two separate clamps each of which would be provided with a depending ear 26, and that said clamps could be spaced apart to straddle the differential casing of a rear axle housing, not shown, where the auxiliary brake 10 was utilized in connection with driven rear wheels of a vehicle. It will also become apparent, as the description proceeds, that the braces 27 and the clamp 24 may be omitted entirely, if desired.

Each of the arms 20 near its free end is provided with an eye or the like 29 by means of which an end of a very strong flexible member, such as a heavy chain 30, as illustrated, or a cable may be attached to said arm. Said flexible members 30 extend upwardly and forwardly from the arms 20 and are secured at their oppoiste ends to eyebolts or the like 31, which are adjustably secured to the side frame members 12 by nuts 32 which engage the eyebolts 31 and which bear against cross members 33 of the frame parts 12, through which the bolts 31 extend. However, the flexible members 30 may be secured in any other suitable manner to the longitudinal frame parts 12 and are of a proper length to be fully extended when the arms 20 are in depending vertical positions directly beneath the axle 13 and the shoe members 21 are in ground or surface engaging positions, as illustrated in Figure 4.

An elongated longitudinally disposed housing 34 is secured to and disposed beneath the cross members 19. A shaft 35 extends transversely through the housing 34 and is journalled therein and has end portions which are journalled in hanger bearings 36, which are fixed to and depend from the frame members 12. One end of the shaft 35 projects outwardly from one of the bearings 36 and is of noncircular cross section, as seen at 37 in Figure 3, to receive a crank or other turning member, not shown, by means of which the shaft 35 may be revolved manually. A pair of reels or drums 38 are mounted on and fixed to the shaft 35 adjacent the bearings 36. A line or flexible member 39 is partially wound on and has an end fixed to each of the drums or reels 38. The other ends of the flexible members 39 extend downwardly and rearwardly from the reels 38 and are shown secured to the brace members 27, near the arms 20. However, said last mentioned ends of the flexible members 39 could be secured to the arms 20, as by being attached to the fastening elements 29, and if desired the reels 38 could be located nearer the bearings 36, than as illustrated in Figure 3.

A brake drum 40 is fixed to the shaft 35 and is rotatably disposed in the housing 34. A brake band 41 has a fixed end 42 secured to a part of the housing 34. Said brake band 41 is loosely disposed within the housing 34 and extends substantially around the brake drum 40 and has an outturned opposite free end 43. The parts 35, 40 and 41 are disposed adjacent a rear end of the housing 34. A cylinder 44 is secured in the bottom part of the housing 34, near its forward end and is provided with an open rear end normally closed by a removable guide member 45. A piston 46 is reciprocably mounted in the cylinder 44 and has a piston rod 47 extending slidably through the central portion of the guide 45. A conduit 48 has a discharge end opening into the cylinder 44, near the forward end of said cylinder. The opposite end, not shown, of the conduit 48 is adapted to be connected to a part of the fluid pressure system of the conventional brakes of a vehicle of which the vehicle part 11 constitutes a part. Said fluid pressure system may constitute either a pneumatic or hydraulic system and it will be readily apparent that a part of the pressure of the system will enter the forward part of the cylinder 44 to pressurize said cylinder part for urging the piston 46 rearwardly toward the guide 45. Sufficient clearance is provided in the opening 45a of the guide 45, through which the piston rod 47 extends, to prevent a pressure or vacuum building up within the cylinder 44 between the piston and guide 45 and which would prevent free movement of the piston 46 toward and away from said guide 45.

A pair of rods or bars 49 and 50 are pivotally connected to one another at adjacent ends thereof at 51 to form a knee joint. The other end of the rod or bar 50 is swingably connected at 52 to the free end portion 43 of the brake band 41 and the other remote end of the rod or bar 49 is pivotally connected at 53 to the outer end of the piston rod 47. The rods 49 and 50 thus form a toggle joint. One end of a rigid link or rod 54 is pivotally connected to the knee joint 51 and the other end thereof is pivotally connected to the outer end of an arm 55 of a bell crank 56 which is pivotally mounted at 57 at its apex on a pivot element which is supported by a portion of the housing 34. A rear end of a forwardly extending flexible member 58 is connected to the outer end of the other upwardly extending arm 59 of the bell crank 56. Said flexible member 58 extends loosely through an opening 60 in the forward end of the housing 34. The other end of the flexible member 58 may be disposed in the cab, not shown, of a draft vehicle to which the trailer vehicle 11 is coupled whereby a forward pull may be manually exerted on the flexible member 58 from a position remote from the housing 34 for rocking the bell crank 56 clockwise as seen in Figure 4 to thereby exert an upward pull on the knee joint 51 to move the toggle joint 49, 50 from an extended position as illustrated in full lines in Figure 5 to a retracted or broken position, as seen in Figure 4. A contractile coiled spring 61 is disposed in the housing 34 and has a forward end connected to the free end of the lever arm 59 and a rear end secured by a fastening 62 to the housing 34 for urging the bell crank 56 to swing in the opposite direction or counterclockwise as seen in Figure 4 for exerting a downward thrust on the knee joint 51 through the link or rod 54 to return the toggle joint 49, 50 to its extended full line position of Figure 5. An adjustable stop, such as a setscrew 63, is threaded upwardly through a lower part of the housing 34 so that the upper end thereof is disposed beneath the knee joint 51 to limit the extent that the knee joint can be displaced downwardly and so that the toggle 49, 50 cannot be displaced downwardly much beyond a straight line position of said parts, as illustrated in Figure 5. The toggle joint is normally maintained in its extended operative position of Figure 5 by the spring 61 which is of sufficient strength to return the toggle joint to this position from its broken position of Figure 4.

Figure 6 illustrates a slightly modified form of the control unit differing from the disclosure of Figures 4 and 5 only in that the conduit end 48 which connects with the cylinder 44a opens into said cylinder between the guide 45b and piston 46, rather than forwardly of the piston, as seen in Figures 4 and 5. In the form of Figure 6, the control unit is adapted for use with a vacuum brake system and so that the conduit end 48 constitutes an inlet end thereof and due to the suction in the brake system, not shown, a vacuum is created in the cylinder 44a between its piston 46 and the guide 45b for urging the piston rod 47 to move outwardly through the guide 45b by a vacuum or suction, rather than the piston rod 47 being urged outwardly through the guide 45 by a pressure, as in Figures 4 and 5. In this modified form of the invention, the bore 45c of the guide 45b has a sufficiently close fitting working engagement around the piston rod 47 to prevent any appreciable leakage of air into the cylinder and so that an adequate vacuum or suction may be maintained therein. The forward end of the cylinder 44a is provided with a vent port 44b for venting the cylinder chamber disposed forwardly of the piston.

Figure 7 illustrates a slightly modified form of the surface engaging brake shoe and wherein said brake shoe, designated generally 21a, has a threaded bore 64 extending downwardly and forwardly at an incline through the rear or trailing part thereof. A threaded spike or rod 65 extends threadedly through the bore 64 and has a lower end 66 extending to below or outwardly of the bottommost or outermost part 67 of the shoe 21a and which part 66 forms a calk, for a purpose which will hereinafter be described. A jamb nut 68 is threadedly mounted on the upper part of the rod or spike 65 and is advanced against the top part of the shoe 21a to retain said rod or spike in a desired adjusted position.

The arms 20 and brake shoes 21 are normally maintained in raised positions as illustrated in Figures 1, 2 and 3 by the flexible members 39. This constitutes an inoperative position of the auxiliary emergency brake 10 and wherein the arms 20 extend forwardly from their pivots 23. The arms 20 are moved to their raised inoperative positions by rotation of the shaft 35 in a clockwise direction as seen in Figures 1 and 4 and while the brake band 41 is held in a released position as seen in Figure 4 by a forward pull on the flexible member 58. When the shaft 35 has thus been turned sufficiently to cause the arms 20 and brake shoes 21 to assume their positions of Figures 1 to 3, the forward pull is released on the flexible member 58 to permit the spring 61 to rock the bell crank 56 counterclockwise from its position of Figure 4 to its position of Figure 5 for engaging the brake band 41 with the brake drum 40 to hold the shaft 35 against rotation and to thus maintain the arms 20 in their positions as best seen in Figure 1. When thus disposed, the strong flexible members 30 hang slack between said arms and their anchoring bolts 31.

The housing or casing 34 is preferably provided with a removable side wall 69 to afford ready access to the parts contained within the housing.

It will be readily apparent that the vehicle operator at a point remote from the casing 34, as for example in the cab of the tractor vehicle, can exert a forward pull on the flexible member 58 from left to right of Figures 4 and 5 to rock the bell crank 56 clockwise about its pivot 57 and against the tension of the pull spring 61, from its position of Figure 5 as seen in full lines to its position of Figure 4. This movement will cause the link 54 to exert an upward pull on the knee joint 51 to thus break the toggle joint 49, 50. As no movement of the piston rod 47 will occur when the bell crank 56 is thus rocked, the pivot point 53 will remain stationary and consequently the free end 43 of the brake band 41 will be pulled from left to right by the rod 50 to thus release the brake band 41 from the drum 40. When this occurs, the arms 20 will swing downwardly and rearwardly by gravity and the shoes 21 will contact the surface 70 engaged by the wheels 14. The arms 20 are of sufficient length so that when in vertical positions beneath the axle 13, as seen in Figure 4, said arms and the shoes 21 will support the wheels 14 in elevated positions out of engagement with the surface 70. The strong flexible members 30 are of a length to prevent the arms 20 from swinging downwardly and rearwardly past depending vertical positions, so that the portion of the vehicle load normally supported by the wheels 14 will be supported solely by the arms 20 and shoes 21. The undersides of the shoes 21 by engagement with the surface 70 will constitute an effective drag which will quickly stop forward movement of the vehicle 11 in a direction from left to right, as seen in Figures 1, 2 and 4. Thus, the auxiliary emergency brake 10 may be manually operated to effect a stoppage of the vehicle 11 where this cannot be accomplished by the regular brake system of the vehicle or where an additional braking action is needed.

Again assuming that the auxiliary brake is in a normal inoperative position, as seen in Figures 1, 2 and 3, if the vehicle is equipped with a pneumatic, hydraulic or other fluid pressure brake system, the fluid pressure in the brake system will maintain the piston 46 in its full line position of Figure 5, as previously described, and so that the brake band 41 will be maintained in an applied position. However, should a leak occur in the brake system, this fact may not become apparent to the vehicle operator ordinarily until it is necessary to make a stop, at which time the vehicle operator would be unable to stop the vehicle. However, with the auxiliary brake attachment 10, when this occurs, pressure in the right-hand end of the cylinder 44 will be diminished by the loss of pressure in the brake system. As the brake band 41 normally tends to assume a straight position out of frictional engagement with the brake drum 40, when the pressure is thus diminished in the cylinder 44, the free end 43 of the brake band 41 will be spring biased from left to right from its full line toward its dotted line position of Figure 5, for displacing the toggle joint 49, 50 from left to right and as the piston 46 freely moves toward the right-hand end of the cylinder 44. At the same time, the link 54 will swing from left to right relative to its pivot on the arm 55 to thereby automatically release the brake drum 40 so that the shaft is free to turn. The weight of the arms 20 and shoes 21 will then cause said arms and shoes to automatically assume their positions as illustrated in Figure 4 for automatically stopping the vehicle before an emergency can occur and to thereby provide warning to the vehicle driver of a failure of the pressure in the brake system.

In a like manner, if the vehicle is equipped with a vacuum brake system, a loss of vacuum therein will similarly permit the piston to move from left to right as seen in Figure 6 in the cylinder 44a for thus automatically releasing the arms 20 in the same manner as just previously described to apply the brakes by movement of the arms 20 and shoes 21 to their positions of Figure 4.

Should a brake system failure occur while the vehicle is not in motion, the arms 20 and shoes 21 would still swing downwardly to contact the surface 70. Accordingly, when an attempt was made to drive the vehicle forwardly, the vehicle would be driven onto the arms 20 and shoes 21 to interrupt its forward motion and thus indicate to the vehicle operator that his brake system has failed.

It will be readily apparent that the vehicle 11 can be backed to cause the arms 20 to be swung forwardly or from left to right sufficiently to return the wheels 14 into a ground engaging position and after which the arms 20 and shoes 21 can be returned to their positions of Figures 1 to 3 by rotation of the shaft 35, as previously described.

The modified shoe 21a can be employed when a vehicle is operating on slippery surfaces and the spike end or calk 66 will effectively function for gripping an icy surface when the shoe 21a in an operative position, corresponding to the position of the shoe 21 in Figure 4.

Various modifications and changes are contemplated and may obviously be resorted to, without departing from the spirit or scope of the invention as hereinafter defined by the appended claims.

I claim as my invention:

1. An auxiliary vehicle brake comprising an elongated arm, means swingably suspending said arm at one end thereof on a part of a vehicle for swinging movement of the arm longitudinally of the vehicle, a surface engaging brake shoe fixed to the other free end of said arm, a reel rotatably supported on said vehicle above and forwardly of the arm, a flexible member wound on said reel and connected to the arm for swinging the arm and brake shoe upwardly and forwardly of its pivot to a raised, inoperative position, said reel including a shaft, a brake associated with said shaft including a brake drum fixed to the shaft and a brake band disposed around a part of said drum, and means connected to said brake band and adapted to be connected to a main brake system of the vehicle for normally holding the brake band in an applied position and for allowing the brake band to release due to the spring action of the brake band upon a failure of the main brake system caused by a leakage, to permit the reel and shaft to turn whereby said arm and brake shoe are released to swing downwardly by gravity for positioning the brake shoe in an operative surface engaging position, said means by which the brake band is adapted to be connected to the vehicle main brake system including a cylinder, a piston slidably mounted in said cylinder, a piston rod connected to said piston, means connecting said piston rod and a free end of said brake band, a conduit adapted to form an extension of the main vehicle brake system and having a discharge end opening into said cylinder for pressurizing a chamber of the cylinder for displacing the piston and piston rod toward said free end of the brake band to normally maintain the brake band in an applied position.

2. An auxiliary vehicle brake comprising an elongated arm, means swingably suspending said arm at one end thereof on a part of a vehicle for swinging movement of the arm longitudinally of the vehicle, a surface engaging brake shoe fixed to the other free end of said arm, a reel rotatably supported on said vehicle above and forwardly of the arm, a flexible member wound on said reel and connected to the arm for swinging the arm and brake shoe upwardly and forwardly of its pivot to a raised, inoperative position, said reel including a shaft, a brake associated with said shaft including a brake drum fixed to the shaft and a brake band disposed around a part of said drum, and means connected to said brake band and adapted to be connected to a main brake system of the vehicle for normally holding the brake band in an applied position and for allowing the brake band to release due to the spring action of the brake band upon a failure of the main brake system caused by a leakage, to permit the reel and shaft to turn whereby said arm and brake shoe are released to swing downwardly by gravity for positioning the brake shoe in an operative surface engaging position, said means by which the brake band is adapted to be connected to the vehicle main brake system including a cylinder, a piston slidably mounted in said cylinder, a piston rod connected to said piston, means connecting said piston rod and a free end of said brake band, a conduit adapted to form an extension of the main brake system and having an end opening into said cylinder for creating a vacuum in a chamber of the cylinder for displacing the piston and piston rod toward the free end of the brake band to maintain the brake band in an applied position.

3. In combination with a motor vehicle including a rear axle, a pair of arms, means swingably suspending said arms beneath said rear axle inwardly of and adjacent the rear wheels of the vehicle, brake shoes fixed to free ends of said arms and remote from the arm pivots, hoist means including a shaft journalled on the motor vehicle forwardly of the rear axle and above the arm pivots, flexible means connecting said arms and hoist means and whereby said arms are swingable upwardly and forwardly relative to their pivots to raised, inoperative positions, brake means associated with said shaft to retain the shaft and hoist means against rotation to maintain said arms in an inoperative position when said brake means is applied, and brake actuating means adapted to be connected to the main vehicle brake system for normally maintaining the brake means in an applied position and for permitting release of the brake means upon failure of the main brake system to permit the arms to be swung downwardly by gravity from their raised inoperative positions to depending operative positions with said brake shoes in ground engaging positions, said brake actuating means including a cylinder having a chamber adapted to be in communication with the main vehicle brake system, a piston slidably disposed in said cylinder, a piston rod fixed to and projecting from said piston, and means connecting the piston rod and a part of said brake means for normally maintaining said brake means in an applied position and for permitting release of the brake means upon operational failure of the main brake system.

4. An auxiliary brake as in claim 3, said means connecting the brake means and piston rod comprising a toggle joint, and manually actuated means operative from a point remote from said brake means connected to the intermediate knee joint pivot of said toggle joint for breaking the toggle joints to manually release said auxiliary brake.

5. An auxiliary brake as in claim 4, and spring means connected to and acting against said manually actuated means and normally resisting breaking of the toggle joint.

References Cited in the file of this patent

UNITED STATES PATENTS

| | | |
|---|---|---|
| 1,640,492 | Everett | Aug. 30, 1927 |
| 1,773,762 | Strano | Aug. 26, 1930 |
| 1,997,807 | Bird | Apr. 16, 1935 |
| 2,519,774 | Letner | Aug. 22, 1950 |
| 2,604,192 | Taylor | July 22, 1952 |

FOREIGN PATENTS

| | | |
|---|---|---|
| 426,630 | Great Britain | Apr. 1, 1935 |